United States Patent
Searle

(10) Patent No.: US 7,281,438 B2
(45) Date of Patent: Oct. 16, 2007

(54) TORQUE MEASURING APPARATUS

(75) Inventor: Robert F. Searle, Amherst, NH (US)

(73) Assignee: Vibrac Corporation, Amherst, NH (US)

( * ) Notice: Subject to any disclaimer, the term of this patent is extended or adjusted under 35 U.S.C. 154(b) by 164 days.

(21) Appl. No.: 11/269,344

(22) Filed: Nov. 8, 2005

(65) Prior Publication Data
US 2007/0113679 A1    May 24, 2007

(51) Int. Cl.
G01L 5/24 (2006.01)
G01L 1/22 (2006.01)
G01L 3/02 (2006.01)

(52) U.S. Cl. .............. 73/862.26; 73/862; 73/862.191

(58) Field of Classification Search ............... 73/862, 73/862.08, 862.191, 862.21–862.31; 209/546; 53/331.5, 490
See application file for complete search history.

(56) References Cited

U.S. PATENT DOCUMENTS

| | | | |
|---|---|---|---|
| 3,495,452 A | | 2/1970 | Johnson, Jr. et al. |
| 3,866,463 A | | 2/1975 | Smith et al. |
| 4,126,818 A | * | 11/1978 | Taylor ......................... 318/46 |
| 4,212,196 A | * | 7/1980 | Krieger et al. ........... 73/862.29 |
| 4,384,493 A | * | 5/1983 | Grunbaum ............... 73/862.29 |
| 4,696,144 A | | 9/1987 | Bankuty et al. |
| 4,794,801 A | | 1/1989 | Andrews et al. |
| 5,152,182 A | | 10/1992 | Searle |
| 5,383,370 A | * | 1/1995 | Abramson et al. ........ 73/862.23 |
| 6,457,352 B1 | * | 10/2002 | Knestel ....................... 73/117 |
| 2005/0052087 A1 | * | 3/2005 | Shinmura et al. ............. 310/89 |

* cited by examiner

Primary Examiner—Edward Lefkowitz
Assistant Examiner—Jonathan Dunlap
(74) Attorney, Agent, or Firm—Pandiscio & Pandiscio

(57) ABSTRACT

A torque measuring apparatus is described that comprises a chassis, a reversible electrical motor having a motor housing and a rotatable output shaft projecting from one end of said motor housing, motor mounting means mounting said motor housing for rotation relative to said chassis, means for connecting said motor output shaft to a rotatable component of a device to be tested, whereby energization of said motor will cause said output shaft to rotate and apply a torque to said rotatable component and the resistance to rotation offered by said rotatable component will result in a reactionary torque that causes said motor housing to rotate relative to said chassis, means responsive to rotation of said motor housing for generating a signal representative of said reactionary torque, and means for converting that signal into a measure of the torque applied by said motor output shaft to said rotatable component.

20 Claims, 9 Drawing Sheets

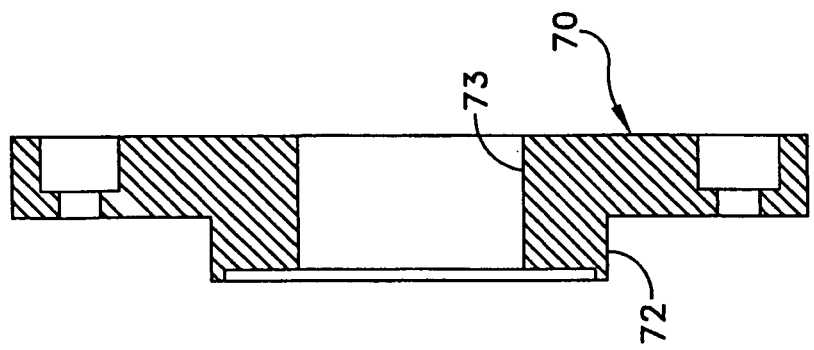
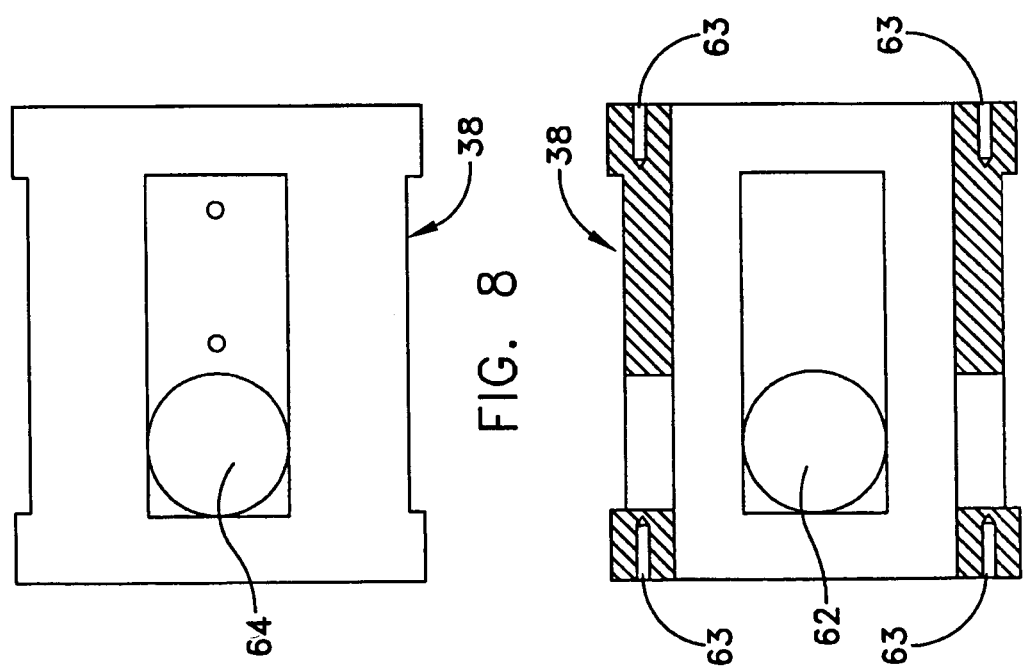

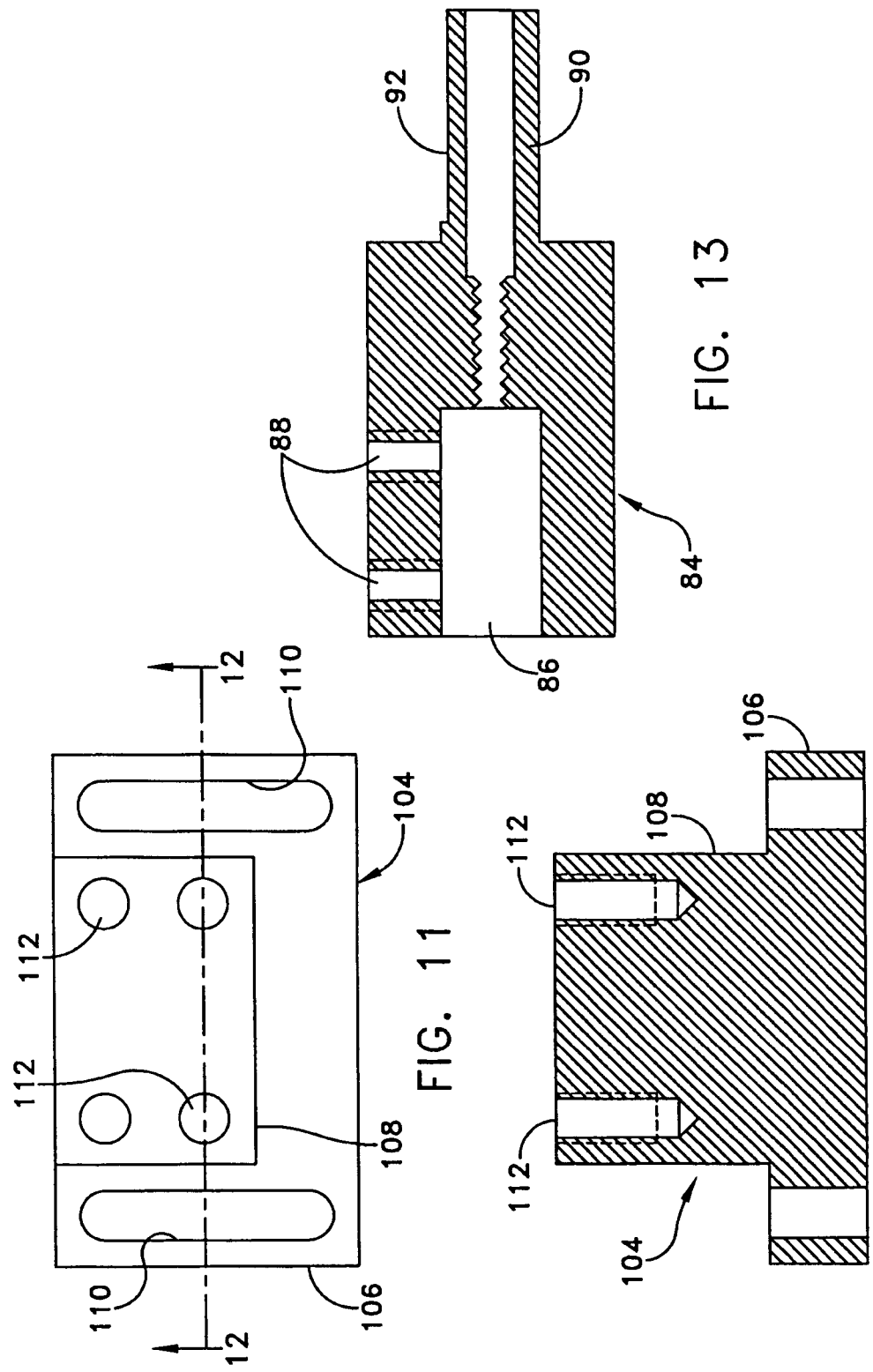

TORQUE MEASURING APPARATUS

This invention relates to torque measurement and more particularly to a novel and improved system and method for conducting torque measurements on a variety of devices and articles having rotatable components, including but not limited to such diverse items as pumps, electric and air motors, ball and roller bearings, disk drives, control knobs, and screw-closures for containers.

BACKGROUND OF THE INVENTION

In many industries it is necessary or desirable to measure the torque required to rotate one of two relatively rotatable components relative to the other of said components for various purposes, e.g., for quality control. Thus, for example, precision bearings, electric and air motors, hydraulic and pneumatic pumps, magnetic tape and disk drives, and control knobs for electronic and mechanical apparatus are commonly required to have a torque resistance to rotational movement that falls within predetermined limits, and in many cases it is essential that the torque measuring system be able to rapidly and reliably provide a pass/fail indication in lieu of or in addition to an indication or measurement of torque value. Similarly in industries involving the manufacture and/or filling of containers having screw-type closures, e.g., flexible or inflatable tubes or bottles used to contain commodities such as toothpastes, shampoos, lotions, adhesives and oils, etc., having reliable means for measuring the torque required to unscrew such caps is desirable to make certain that caps are screwed on tight enough so as not to leak, but also not so hard as to make them difficult to unscrew using only hand action.

Heretofore, many different types of torque measuring devices and systems have been produced for various applications. Such different torque-measuring systems range from those that incorporate or use (a) mechanical dial type torque gages and torque sense-slip clutch mechanisms, as shown, for example, by U.S. Pat. Nos. 4,539,852 and 4,716,772, (b) strain gages as shown by U.S. Pat. Nos. 4,023,404 and 4,811,850, (c) torque sensors producing a digital electronic readout as shown by U.S. Pat. No. 4,794,801, and (d) pneumatic torque-sensing gages as disclosed by U.S. Pat. Nos. 3,866,463 and 4,696,144. See also U.S. Pat. No. 3,495,452, issued Feb. 17, 1970 to C. E. Johnson, Jr. et al. for "Torque Meter". Various forms of cap testers also are known, including relatively simple devices such as the ones disclosed by the following patents: (1) U.S. Pat. No. 4,539,852, issued Sep. 10, 1985 to Jerome H. Feld, (2) U.S. Pat. No. 4,716,772, issued Jan. 5, 1988 to K. B. Bubech et al., and (3) U.S. Pat. No. 4,794,801, issued Jan. 3, 1989 to T. M. Andrews et al. Relatively complex cap testers are revealed in (1) U.S. Pat. No. 3,866,643, issued Feb. 18, 1975 to D. A. Smith et al., (2) U.S. Pat. No. 4,696,144, issued Jul. 29, 1987 to G. E. Bankuty et al., (3) U.S. Pat. No. 4,811,850, issued Mar. 14, 1989 to G. E. Bankuty et al., and (4) U.S. Pat. No. 4,907,700, issued Mar. 13, 1990 to G. E. Bankuty et al.

An improved form of cap tester is disclosed by my prior U.S. Pat. No. 5,152,182, issued Oct. 6, 1992 for "Torque Measuring Apparatus", which features the use of a torque-transmitting shaft, means for coupling the torque-transmitting shaft to one component of an article to be tested, e.g., the screw cap on a bottle, a pair of parallel flexible mechanical beams mounted in like cantilever fashion, and a force-transmitting arm having one end attached to the torque-transmitting shaft and its opposite end extending between the two beams, whereby a torque applied to the component of the article to be tested causes the torque-transmitting shaft to act via the force-transmitting arm to bend one or the other of the two beams according to the direction of rotation of the torque-transmitting shaft. An encoder translates the rotation of the torque-transmitting shaft into an electrical signal output which is used to provide a measure of the magnitude of the applied torque.

OBJECTS AND SUMMARY OF THE INVENTION

The primary object of the present invention is to provide a new apparatus for accurately and rapidly measuring the torque required to rotate a given member relative to another member, with said new method and apparatus being characterized by simplicity and reliability.

Another object is to provide an accurate and reliable apparatus for testing for the torque required to cause relative rotation of two rotatably coupled members regardless of the direction of rotation.

Still another object is to provide an apparatus and method that is adapted to test various kinds of products for the torque required to cause relative rotation of two rotatably coupled components of said products, e.g., to test for the minimum torque required to (a) rotate a motor or pump shaft, (b) turn the inner and outer races of a bearing relative to one another, or (c) to rotate a control knob relative to a supporting assembly or device, including a control knob arrangement that includes a detent mechanism for stepwise rotational movement.

A more specific object is to provide an improved torque tester that is related to the device disclosed in my prior U.S. Pat. No. 5,152,182 in that it uses a pair of mechanical beams and means for deflecting one or the other of those beams in response to an applied torque. The present invention improves upon my prior patented device in that it provides a device that can precisely measure torque resistance characteristics of such diverse products as precision bearings, electric and air motors, hydraulic and pneumatic pumps, and magnetic tape and disk drives.

Another object of the invention is to provide a torque measuring apparatus that can be used for preventive maintenance purposes in the field, e.g., to test a pump that is installed in a system without need to disconnect the fluid lines that connect the pump to that system.

A further object is to provide a torque testing apparatus that can be operated according to a number of test protocols These and other objects hereinafter described or rendered obvious are achieved by a device that comprises a torque measuring apparatus is described that comprises: (1) a chassis; (2) first and second flexible mechanical beams each having first and second opposite ends with said first ends attached to said chassis and said seconds being unattached to said chassis; (3) a reversible electrical motor having a motor housing and a rotatable output shaft projecting from one end of said motor housing; (4) motor support means rotatably secured to the chassis, said motor support means including torque transmitting means comprising first and second force-transmitting means engaged with said second ends of said first and second beams so that rotation of said motor support means in a first direction will cause said first force-transmitting means to bend said first beam and rotation of said motor support means in a second opposite direction will cause said second force-transmitting means to bend said second beam; (5) means securing said motor housing to said motor support means so that said motor housing and motor support means can rotate as a unit relative to said chassis; (6)

an encoder having a rotatable input shaft an adapted to generate an electrical signal in response to rotation of its input shaft; (7) means coupling said motor support means to said encoder input shaft so that rotation of said motor support means and said motor housing will cause rotation of said input shaft; (8) control means for selectively energizing said reversible motor to run in a forward or reverse direction, and (9) circuit means for converting the electrical signal generated by the encoder to a measurement of torque. The apparatus is used by connecting the output shaft of the motor to a rotatable component of a device to be tested, whereby energization of said motor in one current direction will cause said output shaft to apply a torque to said rotatable component and the resistance to rotation offered by said rotatable component will result in a reactionary torque that causes said motor support means and said motor housing to rotate opposite to the direction of rotation of said motor output shaft and cause one or the other of said beams to bend under the influence of one or the other of said force-transmitting means, according to the direction of rotation of said reactionary torque. The encoder translates the rotation of the motor housing into an electrical output that varies as a function of the reactionary torque. The circuit means produces an output signal that is indicative of the magnitude of the reactionary torque.

For a fuller understanding of the nature and objects of the invention, reference should be had to the following detailed description and the accompanying drawings.

THE DRAWINGS

FIG. 8 is a side elevation of a housing component of the motor support assembly;

FIG. 9 is a longitudinal sectional view of the same housing component;

FIG. 10 is a cross-sectional view of a bearing cap component of the same reaction torque assembly;

FIG. 11 is a plan view of a beam support block;

FIG. 12 is a sectional view taken through line 12-12 of FIG. 11;

FIG. 13 is a cross-sectional view through the motor shaft adaptor; and

SPECIFIC DESCRIPTION OF THE INVENTION

Figure 1:
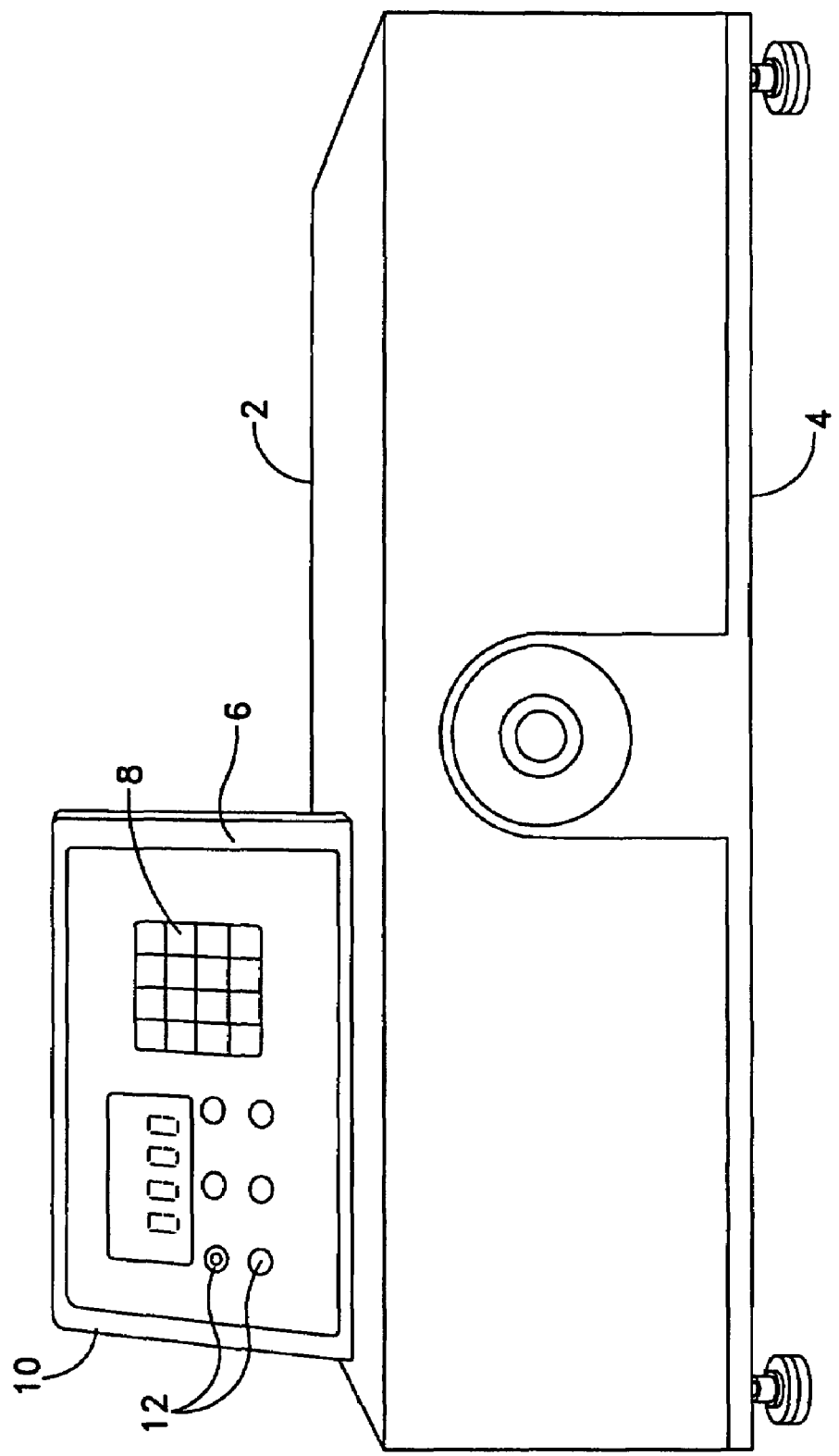
FIG. 1 is a perspective view in front elevation of an instrument embodying the present invention.
Figure 2:
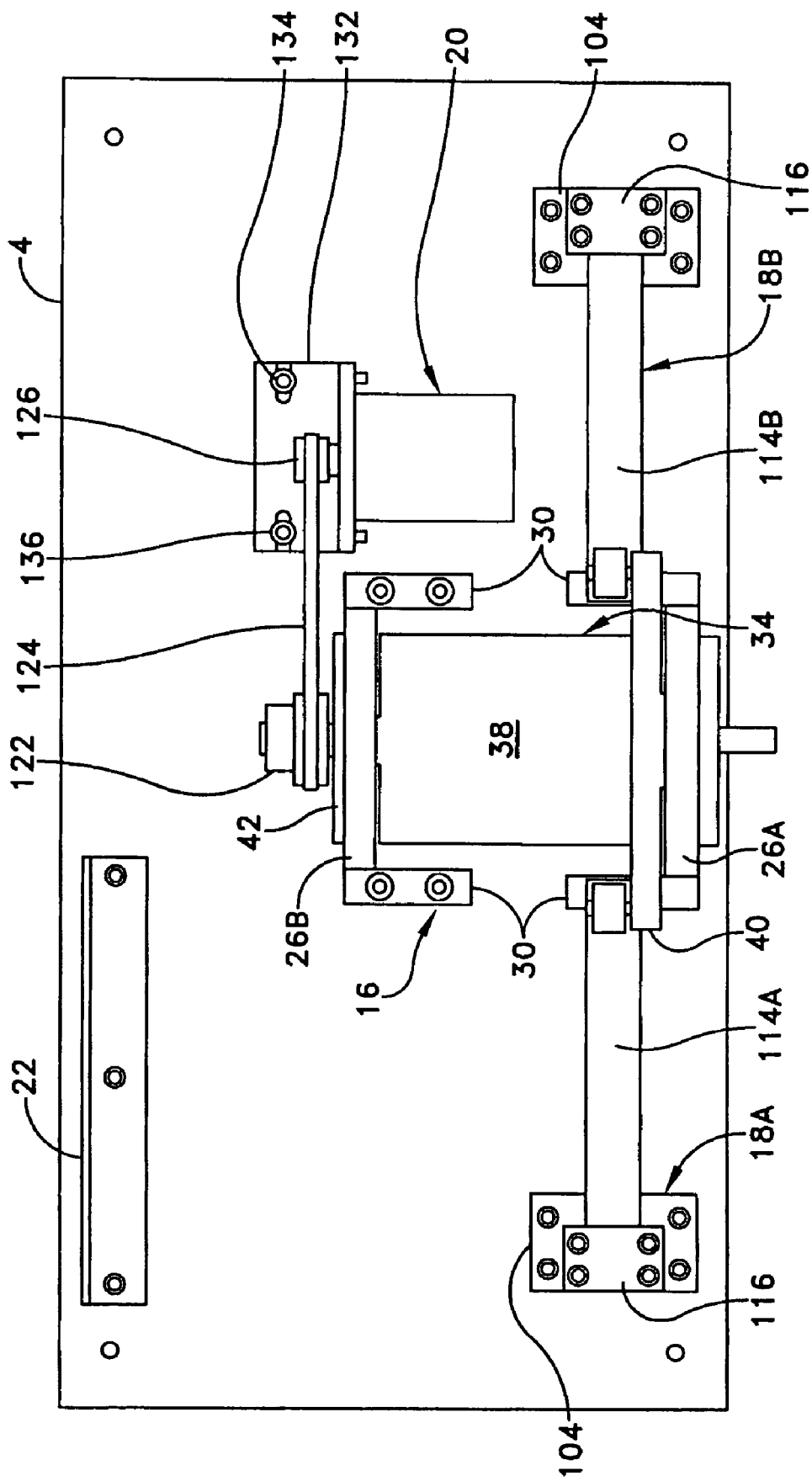
FIG. 2 is a plan view of the same device with the cover removed.

Turning first to FIGS. 1 and 2, the illustrated instrument comprises an instrument housing consisting of a cover 2 and a chassis 4. Formed integral with the cover is a sub-housing 6 containing a keypad 8, other control members 10, a visual display monitor 10 that displays results of measurements made with the instrument, and a mode display comprising a plurality of light emitting diodes 12.

Figure 3:
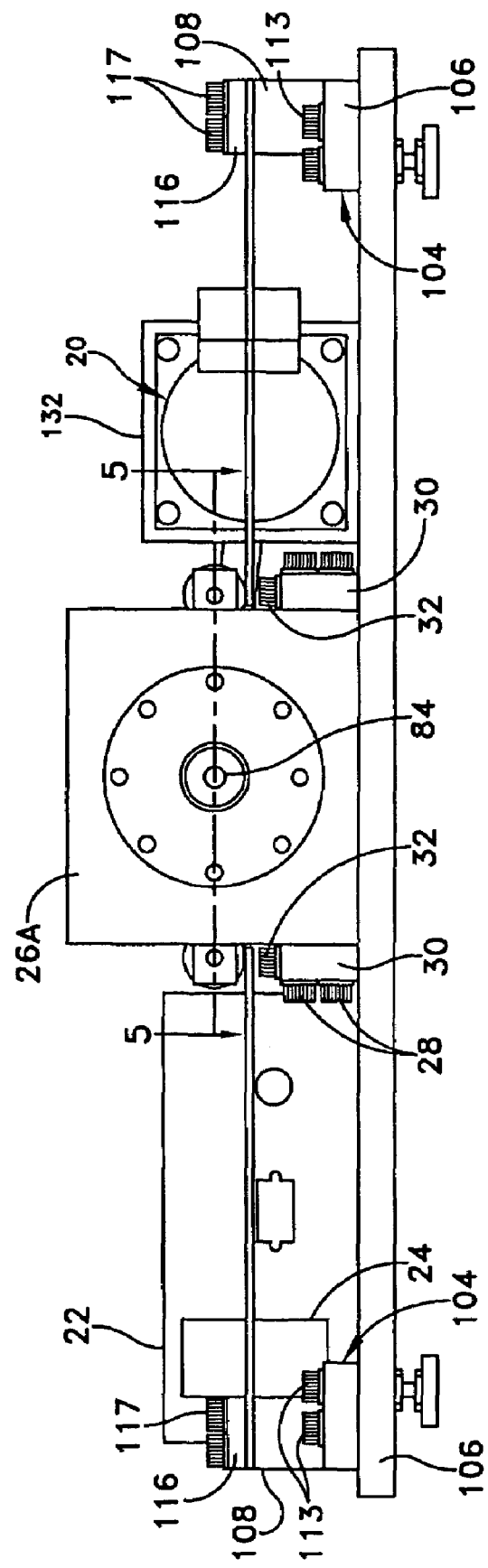
FIG. 3 is a front view of the apparatus shown in FIG. 2.
Figure 4:
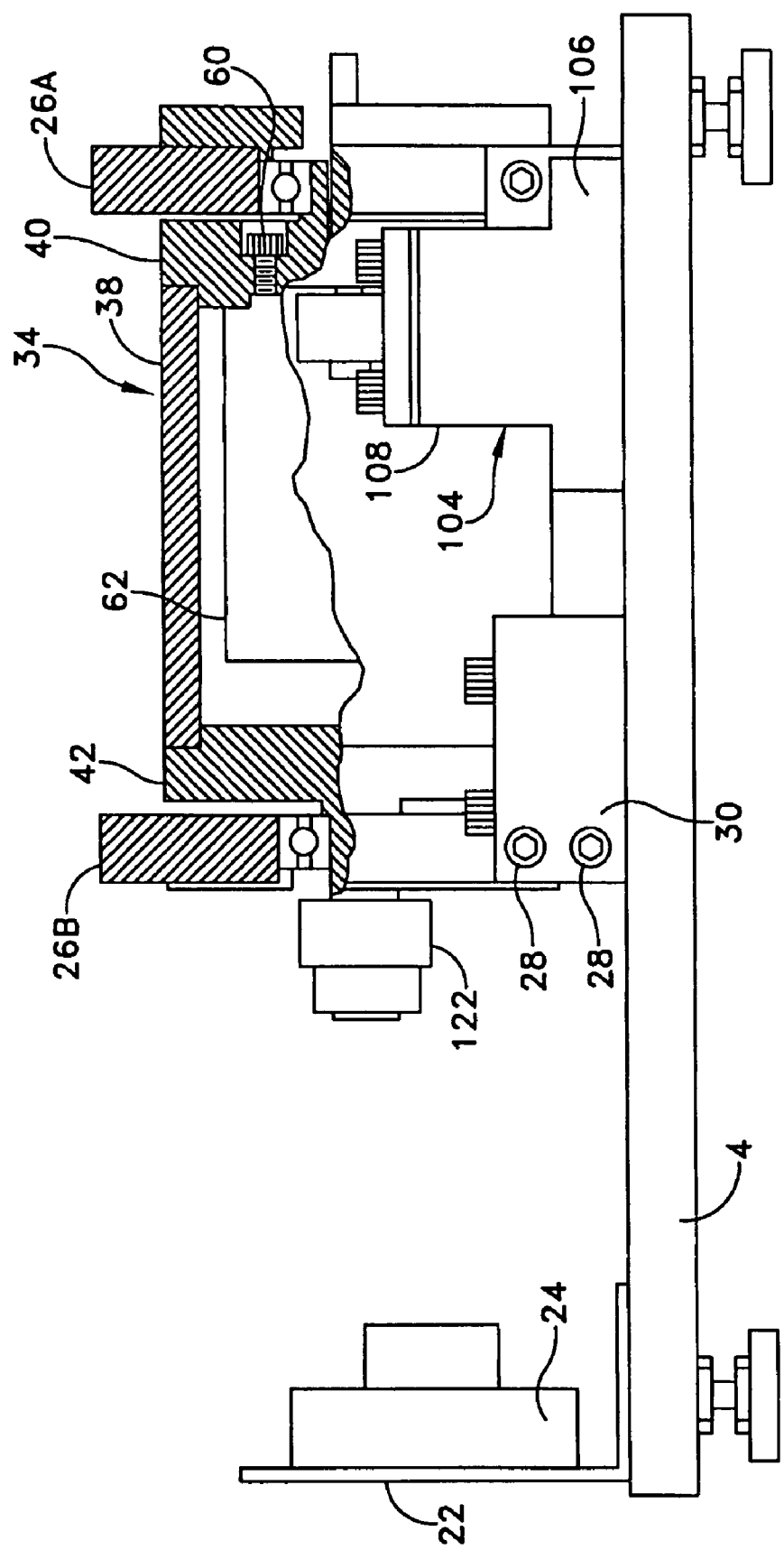
FIG. 4 is a side elevation of the same apparatus.

Referring to FIGS. 2-4, chassis 4 supports a reaction torque drive assembly represented generally at 16, a pair of beam block assemblies represented generally at 18A and 18B, and an optical encoder 20. Also supported on the chassis is a rear panel 22 that serves to support an input power switch represented generally at 24. Switch 24 may be accessible for manual operation through an opening in the rear side of the cover 2 or it may be wired for operation via one of the front panel control members 10.

The reaction torque drive assembly comprises a pair of support plates 26A and 26B which are secured by screws 28 (FIGS. 3, 4) to a pair of support blocks 30. The latter in turn are secured to chassis 4 by screws 32. The end plates 26A and 26B are formed with center holes to accommodate other components of the drive assembly 16 as hereinafter described. Drive assembly 16 also includes an enclosure 34 that comprises a cylinder 38, a torque member 40, and an end bell member 42. Members 40 and 42 are secured to cylinder 38 by screws 46 as shown in FIG. 5.

Figure 7:
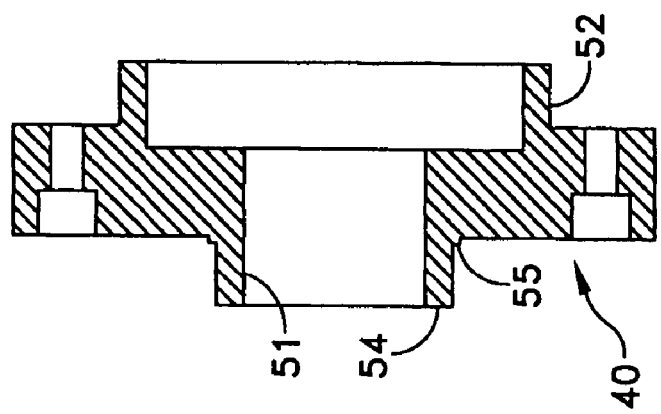
FIG. 7 is a center sectional taken along line 7-7 of FIG. 6.
Figure 6:
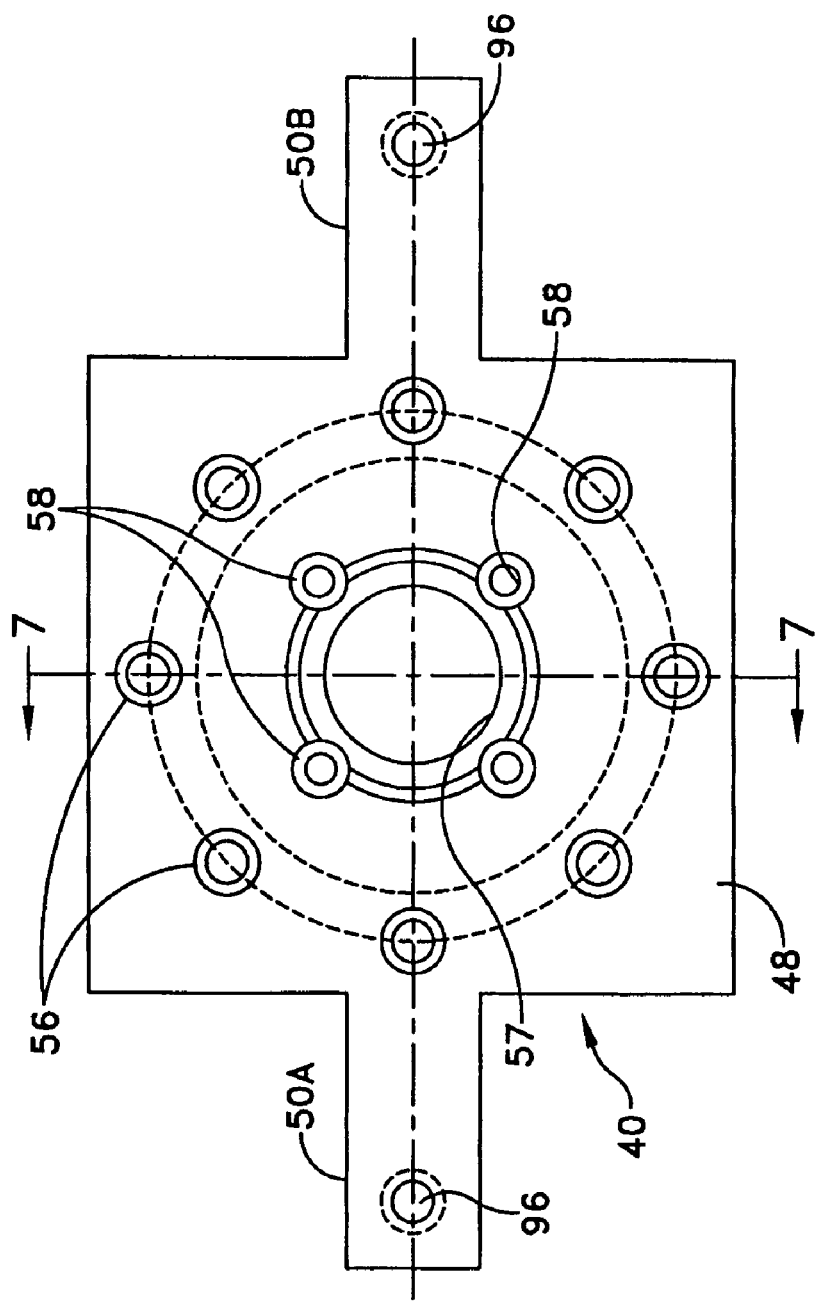
FIG. 6 is a front elevation of the torque member forming part of the reaction torque assembly.

Referring to FIGS. 6 and 7, the torque member 40 comprises a square shaped body portion 48 and a pair of arms 50A and 50B projecting from opposite sides thereof. Body portion 48 has a center hole 51, a large diameter cylindrical collar 52 on one side and a smaller diameter cylindrical collar 54 on its opposite side. It also has an annular shoulder 55 at the base of collar 54. In addition, body portion 48 is provided with two concentric circular arrays of holes 56, 58, with the outer holes 56 being provided for use in attaching torque member 40 to cylinder 38 by means of screws 46. The inner set of holes 58 are threaded blind holes that are used to receive screws 60 (FIG. 4) for securing in place the housing of a d. c. stepper motor 62. Thus stepper motor 62 and torque member 40 are anchored to one another, with torque member 40, cylinder 38, and end bell member 42 serving as a motor support structure for motor 62. Cylinder 38 is provided with four side openings 64 to accommodate wire leads (not shown) for connection to motor 62. Cylinder 36 also has a number of threaded holes 63 at each end to secure screws 46.

The large diameter cylindrical collar 52 of torque member 40 is sized to fit within cylinder 38, and the smaller diameter cylindrical collar 54 is sized to fit within the inner race of a front bearing assembly 66, with its shoulder 55 acting as a retainer for that inner race. The outer race of bearing assembly 66 makes a close fit within the center hole of front support plate 26A. A bearing cap 70 (FIGS. 5, 10) is attached to front support plate 26A by screws 71 as shown in FIG. 5. Bearing cap 70 has a cylindrical flange 72 on its inner face that extends within the center hole in front support plate 26A and bears against the outer race of bearing assembly 66 to hold the bearing assembly in place. Bearing cap 70 also has a center hole 73 (FIG. 10).

Figure 5:
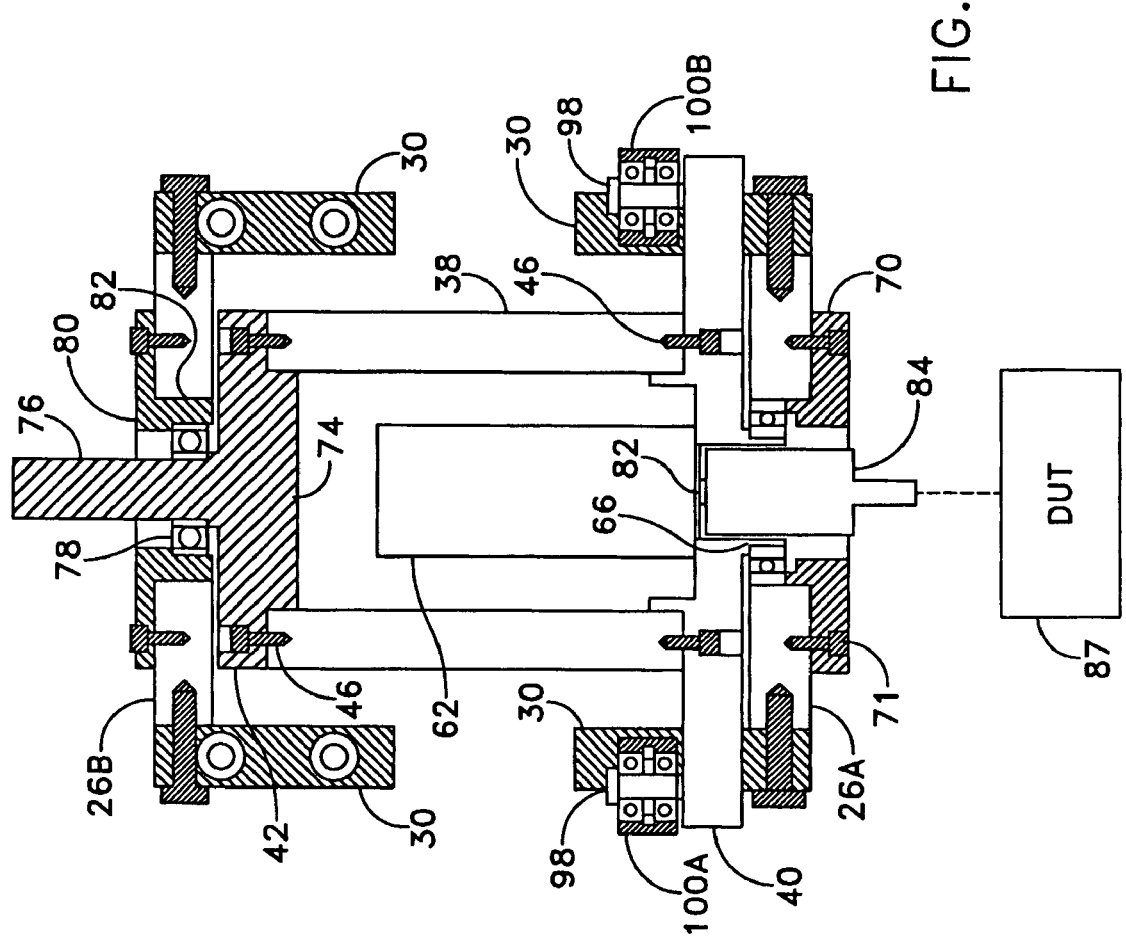
FIG. 5 is a sectional view taken along line 5-5 of FIG. 3 showing details of the reaction torque assembly.

The end bell member 42 comprises a cylindrical plate 74 that is secured to cylinder 38 by screws as shown in FIG. 5. It also comprises a shaft 76 that extends through the center hole in the rear support plate 26B. Shaft 76 is surrounded by a rear bearing assembly 78 and has a shoulder that engages and retains the inner race of that bearing assembly. Also disposed in the center opening end of rear support plate 26B is a bearing holder 80. The latter is formed with a cylindrical collar 82 that surrounds and has an internal shoulder that engages and retains the outer race of the bearing assembly 78. Bearing holder 80 is secured to rear support plate 26B by screws as shown in FIG. 5.

Referring to FIGS. 2, 5 and 13, stepper motor 62 has an output shaft 82 that is fitted with an adaptor 84 for use in connecting it to the rotatable component of a device under test ("DUT") 87. Adaptor 84 has an axial opening 86 at one end to receive shaft 82 and is releasably secured to that shaft by screws (not shown) that are received in threaded holes 88. Adaptor 84 also has a small diameter extension 90 for connection (directly or by an intervening connecting means) to a rotatable component of a device whose torque characteristic is to be measured. Extension 90 may be provided with a flat surface 92 to facilitate such connection. The adaptor may vary in size and shape according to the particular component to be tested. The adapter extends through center hole 73 in bearing cap 70, with hole 70 being sized to permit rotation of the adaptor.

As a consequence of the structural relationship of the foregoing components, motor 62 and its support structure are rotatably mounted on the chassis so that the center axis of the motor, i.e., the longitudinal axis of the motor housing and the longitudinal axis of motor output shaft 82, is coaxial with bearing assemblies 66 and 78.

Referring now to FIGS. 2, 5 and 6, the arms 50A and 50B of torque member 40 are provided with threaded holes 96 to accommodate screws 98 that serve to rotatably secure rollers 100A and 100B to arms 328A and 28BA respectively. Preferably rollers 100A and 100B 28BB respectively are provided with ball bearings as shown at 102 to assure that they are free to rotate.

Turning now to FIGS. 2, 3 and 4, the two beam assemblies 18A and 18B are identical except that they are mounted so as to extend in opposite directions. Each of the beam assemblies comprises a beam support block 104 that comprises a rectangular base 106 and an upstanding projection 108. The base 106 is provided with a pair of elongate holes 110 and the upstanding projection 108 is formed with a plurality of blind threaded holes 112. Each support block 104 is secured to chassis 4 by means of screws 113 passing through holes 110. The holes 110 are elongate to permit adjustment of the position of the beam support block relative to the reaction torque drive assembly. Attached to each beam support block is a metal beam 114. In FIG. 2, the two beams are identified as 114A and 114B. The beams are secured to the beam support blocks 104 by means of cap plates 116 that are secured to the beam support block by screws 117 received in threaded holes 112. Beams 114A and 114B extend under and are engaged by the rollers 100A and 100B respectively of the reactions torque drive assembly. The height of the beam support blocks 104 are set so that the beams are engaged with rollers 100A and 100B when the beams are in their undeflected state.

The nature and bending modulus of elasticity of the materials of which the beams are made, the mechanical geometry of the beams, and the stress levels to which the beams are subjected are selected so as to optimize the long term performance and reliability of the apparatus. These considerations, coupled with an initial calibration procedure, enable the practitioner of the invention to convert an expected non-linear beam deflection curve to a substantially linear beam deflection curve with an accuracy deviation of 0.2% or less, but in any event at least less than 0.5%.

Referring again to FIGS. 2 and 4, mounted on the shaft 76 of end ball member 42 is a pulley 122. Surrounding pulley 122 is a belt 124 that in turn runs around and engages a second pulley 126 that is mounted on the input shaft of optical encoder 20. The encoder is attached to an L-shaped bracket plate 132 that is affixed to chassis 4 by two screws 134 that are received in two elongate holes 136 in the bracket. The elongate holes 136 allow the position of the encoder to be adjusted to provide proper belt tension.

Mechanical operation of the foregoing device will now be described. Assume for purposes of description that the adaptor 84 has been coupled to a rotatable component of a device 87 whose torque characteristic is to be measured, e.g., the impeller of a pump. The operator initiates operation by appropriately inputting the proper commands via the keypad 8. When this occurs, stepper motor 62 is energized so as to cause its output shaft to rotate in one direction or the other, according to the programmed instructions. Rotation of the output shaft of motor 62 will be transmitted via adaptor 84 to the device 87 to be tested. If the rotatable component of the device to be tested offered no resistance to rotation, the housing of stepper motor 62 (and thus the enclosure 34) will remain stationary. However, when adaptor 84 encounters resistance to rotation of the rotatable component of a device 87 under test, that resistance will result in a reactionary torque that will cause the housing of motor 62 and the enclosure 34 to rotate in a direction opposite to the direction of rotation of adaptor 84. With reference to FIG. 3, if motor 62 is energized so as to rotate adaptor 84 clockwise, the housing of motor 62 and enclosure 34 will rotate in the opposite direction, causing the arm 50A of torque member 40 to move down and bend beam 14A. The rotation of enclosure 28 is communicated via the pulley and belt arrangement 110, 112 and 114 to encoder 116, whereupon the latter will generate an electrical output signal that varies as a function of the rotation of the motor housing and enclosure 28. The encoder's output signal is then processed to provide a measurement that is displayed via the value display monitor 10. When the reaction torque is removed, e.g. by stopping motor 62, beam 14A will provide a restoring force to return torque member 40 to its original neutral position wherein both beams are undeflected. If motor 62 is energized so as to rotate adaptor 84 counterclockwise, the reaction torque will result in arm 50*b* rotating down (FIG. 3) to bend beam 14B, and the encoder will again generate a signal that varies as a function of the rotation of the motor housing and enclosure 28.

It is to be appreciated that the amount of deflection of the beam 16 or 18 by rotation of torque arm 58 is a function of the applied torque, the length of arm 58, the effective lengths of beam 16 (or 18) and arm 58, the beam dimensions, and the bending modulus of the beam. By loosening the screws 113 that lock beam support blocks 104 to the chassis, it is possible to move the beam assemblies toward and away from torque member 40 to the extent permitted by the length of elongate holes 110 so as to alter the effective length of the beams and thereby vary the range of possible torque value measurements. That range can also be varied by replacing the beams with thicker or thinner beams.

Figure 14:
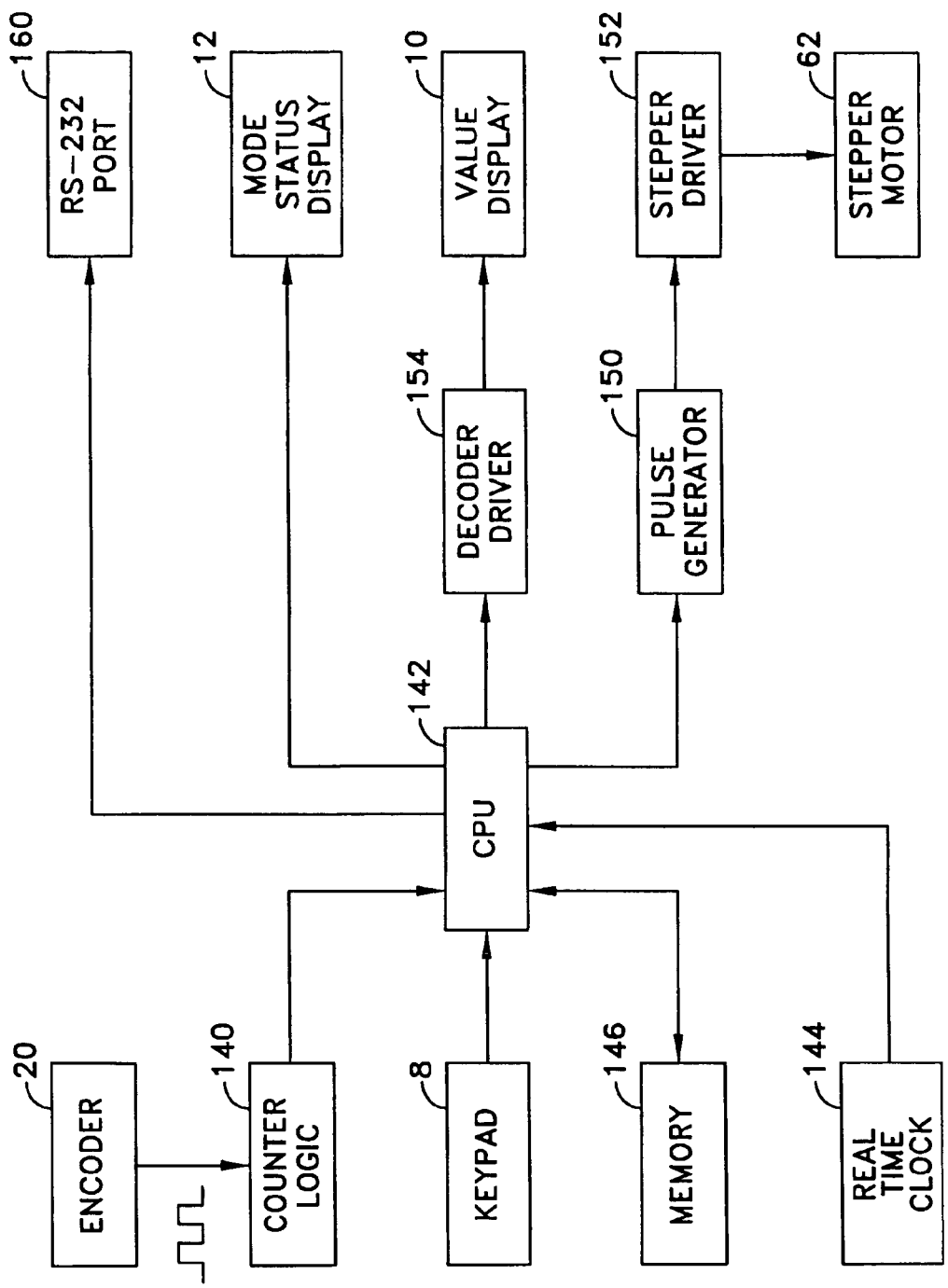
FIG. 14 is a block diagram of the electronic system embodied in the preferred embodiment of the invention.

FIG. 14 schematically illustrates one form of electrical system that is used to control operation of the above described apparatus. The encoder 20 provides two identical phase-displaced series of rectangular pulses which are fed to a counter logic circuit 140 which compares the two series of phase displaced pulses to determine the direction of rotation of the encoder's input shaft. Preferably but not necessarily, the encoder may be as described in my prior U.S. Pat. No. 5,152,182. The counter logic circuit produces a single train of output signal pulses representative of the direction and degree of rotation of the encoder's input shaft, and that train of output signal pulses is fed to a digital computer which comprises a CPU 142, a real-time clock 144, and a memory unit 146. The CPU 142 has an input port connected to keypad 8 which is used to apply command signals to the CPU. The input signal to the CPU from clock 144 provides the current date and time, and the CPU in turn is programmed to respond to the output of counter logic circuit 140 and to provide command signals to a pulse generator 150 that provides stepping pulses to a stepper motor driver 152. The latter is coupled to stepper motor 62 and operates to drive the motor in a forward or reverse direction according to the commands from CPU 142.

Memory unit 146 serves to store information generated by the CPU in response to the counter logic circuit 140. The CPU is coupled to a decoder driver 154 which decodes the output signals from counter logic circuit 140 into a form suitable for driving the value display monitor 10. The CPU also is coupled to light-emitting diodes 12 that function as a mode status display. The CPU also has an RS-232 output port 160 which can be coupled to a printer or other recording, display or transmitting device. By way of example but not limitation, the output port 160 can be activated on demand to respond to a predetermined program, e.g., to feed test results to a printer when a predetermined number of torque values have been stored in the memory unit. Memory unit 132 also can be accessed to provide input to value display monitor 110.

The reaction torque that causes deflection of beam 114A or 114B produces a force on that beam via torque member 40 that varies as a cosine of the angle between arm 50A or 50B and the beam that is being deflected by that arm. Accordingly it is to be understood that the CPU is programmed so as to cause the decoder driver 154 to modify the pulse count from counter logic 140 so that (a) it reflects the fact that the force applied to the beam 114A or 114B by rotation of torque member 40 varies as a function of the cosine of the angle between 50A or 50B and the beam being deflected by that arm, and (b) the values in torque units displayed by display monitor 10 will vary uniformly as a function of the cosine of that angle. The CPU also is programmed to vary the input to decoder driver 154 so as to provide a suitable calibration correction calculated in substantially the same manner described in my U.S. Pat. No. 5,152,182. The teachings of that patent relevant to the present invention are incorporated herein by reference.

The CPU also is programmed to cause the apparatus to execute several modes of operation, with the mode of operation being selected by inputting commands from keypad 8. To that end the computer program is designed so that each key of the keypad serves a different command function, and each key bears a legend identifying its command function.

A first mode is identified as the "Run-In" mode. According to this mode the stepper motor is commanded via keypad 8 to rotate a device under test for a selected (programmable) distance measured in degrees of rotation, or for a selected (programmable) time measured in minutes, and then stop. For this mode the test speed, i.e., the speed at which the stepper motor rotates the device under test, may be fixed or may be subject to operator control via the keypad. During this run-in period the live torque values are displayed by monitor 10. This Run-in mode may be used as a preliminary protocol before conducting other more specific tests hereinafter described. While the system is operating in this mode one of the LED status indicators 12 identified as "Run-in" is turned and another LED status indicator identified as "Degrees/Minutes" are turned on.

A second mode is identified as the "1-Direction" test mode. In this mode, the stepper motor is commanded to unidirectionally rotate a device under test with the direction of rotation being selected via keypad 8, and the computer will then operate to measure and display the peak reaction torque via display value monitor 10. The test results are saved in memory 146 and/or outputted through the RS-232 port 160. For this test the test speed and the distance or time for the test is programmed by selection via keypad 8. Another of the LED status indicators 12 identified as "1 Direction" is turned on while the system is operating in this mode.

A third mode is identified as the bidirectional test mode. In this mode, the stepper motor is commanded to rotate a device under test in a direction selected via operation of keypad 8, and the computer than operates to measure and display the peak reaction torque in that direction. The system will then drive the stepper motor in the opposite direction and once again the peak torque will be measured. The measured value from the second direction can be viewed by pressing a keypad key that controls operation of the value display monitor 10. Both values are stored in memory and/or outputted via port 160. In this test mode, the test speed and the distance or time to test are selected via the keypad. Another one of the LED status indicators 12 identified as "2 Direction" is turned on while the system is operating in this mode.

A fourth mode of operation is the set torque test mode. In this mode the apparatus will rotate the device under test in a direction selected on the keypad until a set torque is achieved or the torque drops off suddenly. Again the results are displayed and also stored in memory and/or outputted via port 160. Another one of the LED status indicators 12 identified as "Set Torque" is turned on while the system is operating in this mode.

The program controlling the CPU may be designed to permit the system to carry out other functions or other modes of operation, e.g. compute average values when testing a number of devices of like structure and design, permit values to be displayed in metric or English units, set upper and/or lower limits for peak reaction torque, and set test speed.

In the preferred embodiment of the invention, the LED indicators 12 are selectively energized to indicate which of the foregoing test modes is being executed by the system and also to indicate (a) when the device under test is being rotated for a given distance (degrees of rotation) or a given time (minutes), (b) whether the measured values are in metric or English units, and (c) when a test has been completed. To that end the indicators 12 are distinguished from one another by identified by suitable following labels, e.g., "1 Direction", "2 Direction", "Run-in" and "Set Torque".

Although no specific computer program is shown, how to program a digital computer is well within the skill of the art and, therefore, no further explanation, description or drawing is required in order to program CPU 141 to provide and execute the several test modes described above. Of course the computer program may be programmed to perform other tasks. Thus the CPU may be programmed to process the data stored in memory unit 146 so that selectively, on command from keypad 8 or automatically, the memory will provide an output to display monitor 10 or output port 160 that indicates one or more of the following: (a) the highest (and/or lowest) measured value within the predetermined limits, (b) the average of the measured values, (c) the standard deviation, (d) the total number of articles or specimens tested, and (e) the date (and optionally, the time) of the test. Additionally, if the specimens are identified by a lot or specimen number, that further identification may be inputted by the keyboard, and the CPU may be programmed so that the further identification inputted by the keypad will cause that information to be stored in memory unit 132 and/or included in a printout from printer 134.

The invention also is susceptible of other modifications. Thus beams 114A and 114B may be made of different metallic and non-metallic materials, although stainless steel is preferred. Use of a single resilient beam instead of two beams also is possible, although then torque may be measured only in one direction of rotation. The keypad 8 may be replaced by a plurality of manually operated switches, since the purpose of the keypad is simply to issue a select but limited number of commands to the CPU. The form of the control circuit shown in FIG. 14 also may be varied in ways obvious to persons skilled in the art.

The foregoing invention offers a number of advantages. It permits both unidirectional and bidirectional testing. It also can be used for life testing of such devices as disk drives and bearings. The apparatus permits the computer to be programmed for automatic logging of test results and also facilitates simple keypad programming of the CPU for selection of test modes and displaying, storing and/or outputting test results. Also the invention may be used for many different applications. Consequently, for example, the adaptor member 104 may be replaced by other adaptors or tools designed to facilitate torque testing of different articles, e.g., roller or ball bearings, electric motor shafts, and other products.

Still other changes, modifications, additions and advantages will be obvious to persons skilled in the art from the foregoing description. Therefore the scope of this invention is to be determined by the appended claims which are to be considered in the context of the spirit and letter of the foregoing description. The following claims, the foregoing description and the abstract are all to be considered as part of the disclosure of the invention.

What is claimed is:

1. A torque measuring apparatus comprising:
   a chassis;
   first and second flexible mechanical beams each having first and second opposite ends with said first ends attached to said chassis and said seconds being unattached to said chassis;
   a reversible electrical motor having a motor housing and a rotatable motor output shaft projecting from one end of said motor housing;
   means for coupling said motor output shaft to a rotatable component of a device to be subjected to torque measurement;
   motor support means rotatably secured to said chassis, said motor support means including first and second force-transmitting means engaged with said second ends of said first and second beams so that rotation of said motor support means in a first direction will cause said first force-transmitting means to bend said first beam and rotation of said motor support means in a second opposite direction will cause said second force-transmitting means to bend said second beam;
   means securing said motor housing to said motor support means so that said motor housing and motor support means can rotate as a unit relative to said chassis; and
   measuring means coupled to said motor support means for generating an electrical signal output that varies as a function of the rotation of said motor support means;
   whereby when said motor output shaft is coupled to a rotatable component of a device to be subjected to torque measurement and said motor is energized so as to rotate said motor output shaft in a first direction, (1) said motor output shaft will apply a torque to said rotatable component and the resistance to rotation offered by said rotatable component will result in a reactionary torque that causes said motor support means and said motor housing to rotate in a second opposite direction and cause one or the other of said beams to bend under the influence of one or the other of said force-transmitting means, according to the direction of rotation of said reactionary torque, and (2) said measuring means will generate an electrical signal that varies as a function of said reactionary torque.

2. An apparatus according to claim 1 wherein said measuring means comprises an encoder having a rotatable input shaft, and encoder coupling means coupling said motor support means to said encoder input shaft so that rotation of said motor support means and said motor housing will cause rotation of said encoder input shaft.

3. An apparatus according to claim 2 wherein said encoder coupling means comprises a first pulley attached to and rotatable with said motor support means, a second pulley attached to said encoder input shaft, and belt extending around said first and second pulleys.

4. An apparatus according to claim 1 wherein said motor support means comprises first and second mutually spaced end members and a connecting member extending between and secured to said first and second end members, and said motor housing is attached to one of said end members.

5. An apparatus according to claim 4 wherein first and second force-transmitting means are attached to said first end member.

6. An apparatus according to claim 1 further including first and second supports attached to said chassis, and further including first and second means rotatably attaching said motor support means to said first and second supports.

7. An apparatus according to claim 6 wherein said first end member comprises said first and second first and second force-transmitting means and said second end member comprises a connecting shaft, and further wherein said measuring means is coupled to said connecting shaft and measures rotation of said connecting shaft.

8. An apparatus according to claim 1 wherein said first and second force-transmitting means include rollers engaged with said first and second beams respectively.

9. Apparatus according to claim 1 further including means for adjusting the position of said of at least one of said beams relative to said motor support means.

10. An apparatus according to claim 1 wherein said measuring means comprises electronic means for determining and displaying the magnitude of the torque required to cause rotation of the rotatable component of a device that is coupled to said motor output shaft.

11. An apparatus according to claim 1 wherein said motor is a d. c. stepper motor.

12. An apparatus for measuring the reaction torque of a device having a first component that is rotatable relative to a second component, said apparatus comprising:
    a chassis;
    first and second flexible mechanical beams each having first and second opposite ends with said first ends attached to said chassis and said second end being free to move;
    a reversible electrical stepper motor having a motor housing with a longitudinal center axis and a rotatable motor output shaft projecting from one end of said motor housing along said longitudinal center axis;
    means for coupling said motor output shaft to a rotatable component of a device to be subjected to torque measurement;
    motor support means rotatably secured to said chassis for rotation on a selected axis, said motor housing being attached to said motor support means so that said motor output shaft extends along said selected axis and so that said motor housing and said motor support means can rotate as a unit relative to said chassis;

first and second force-transmitting means connected to said motor support means and engaged with said second ends of said first and second beams respectively so that rotation of said motor support means and said motor housing in a first direction will cause said first force-transmitting means to bend said first beam and rotation of said motor support means and said motor housing in a second opposite direction will cause said second force-transmitting means to bend said second beam;

measuring means coupled to said motor support means for generating an electrical signal output that varies as a function of the rotation of said motor support means and said motor housing, whereby energization of said motor to rotate said motor output shaft in one direction will cause said output shaft to apply a torque to said rotatable component and the resistance to rotation offered by said rotatable component will result in a reactionary torque that causes said motor support means and said motor housing to rotate in an opposite direction and cause one or the other of said beams to bend under the influence of one or the other of said force-transmitting means according to the direction of rotation of said reactionary torque; and computer means for converting said electrical signal output into a measure of said reactionary torque.

13. In combination with a device having a first component rotatable relative to a second component, apparatus for measuring the torque required to rotate said first component relative to said second component, said apparatus comprising:

a chassis;

first and second flexible beams each mounted to said chassis in cantilever fashion so that one end thereof is fixed to said chassis and the other end thereof is free to flex relative to said chassis;

a motor comprising a housing and an output shaft rotatably mounted in and protruding from one end of said housing, said shaft undergoing rotation when said motor is activated;

a motor support rotatably mounted to said chassis for rotation on a selected axis;

means securing said motor housing to said motor support so that said output shaft extends along said selected axis, whereby said housing will rotate with said motor support relative to said chassis;

first and second force-transmitting means rotatable with said motor support and said motor housing, said first and second force-transmitting means being engaged with said free ends of said first and second beams so that rotation of motor support and motor housing in one direction will cause said first force-transmitting means to deflect said first beam and rotation of said motor support and motor housing in the opposite direction will cause said second force-transmitting means to deflect the other of said beams, said first and second beams having the capability when bent of applying a restoring force to said first and second force-transmitting means respectively, whereby when said motor is activated so as to cause said output shaft to apply torque to said first component said motor support will rotate in response to the resistance to rotation offered by said first component, and rotation of said motor support will (1) cause said first or second force-transmitting means to force said first or second beam respectively to bend depending on the direction of rotation, and (2) cause said encoder to produce an output signal that varies as a function of the degree of rotation of said motor support and the torque required to cause relative rotation of said first component relative to said second component;

an encoder having a rotatable input shaft;

means coupling said motor support and said encoder input shaft so that rotation of said motor support will cause rotation of said encoder input shaft; and electrical means coupled to said encoder and responsive to said encoder output signal for providing an output indication of the magnitude of the torque required to cause relative rotation of said first and second members.

14. Apparatus according to claim 13 wherein said motor support comprises first and second opposite end members rotatably mounted to chassis, and said first and second force-transmitting means are integral portions of said first end member.

15. Apparatus according to claim 14 wherein each of said first and second force-transmitting means comprises a roller engaged with one of said beams.

16. An apparatus according to claim 13 wherein said motor support comprises first and second opposite end members rotatably mounted to said chassis, and further wherein said first end member comprises said first and second force-transmitting means and said second end member comprises a connecting shaft that is coupled to said encoder input shaft so that rotation of said motor support will cause rotation of said encoder input shaft.

17. Apparatus according to claim 16 wherein said connecting shaft and said encoder input shat are connected by a pulley and belt arrangement.

18. In combination with a device having a rotatable component, apparatus for measuring the torque required to rotate said rotatable component comprising a reactive torque drive assembly, control means for causing said reactive torque drive assembly to apply a torque to said rotatable component, and means driven by said reactive torque drive assembly for generating an output signal representative of the torque required to rotate said rotatable component in said device;

said reactive torque drive assembly comprising a stepper motor having a housing and a rotatable output shaft coupled to said rotatable component, motor support means rotatably mounting said motor to a chassis for rotation on an axis that is coaxial with said housing and said output shaft, and first and second force-transmitting means attached to and rotatable with said motor housing relative to said chassis;

said driven means comprises first and second flexible beams each mounted to said chassis in cantilever fashion so that one end thereof is fixed to said chassis and the other end thereof is free to flex relative to said chassis, said other ends of said first and second beams are engaged by said first and second force-transmitting means so that rotation of said motor housing will cause said first or second force-transmitting means to force said first or second beam respectively to bend depending on the direction of rotation of said motor housing, and means generating a signal in response to rotation of said motor housing; and said control means comprising means for selectively energizing said motor so as to cause said output shaft to apply a torque to said rotatable component, whereby said motor housing will rotate in response to the resistance to rotation offered by said rotatable component, and means for processing said signal so as to provide a measure of the torque required to cause rotation of said rotatable component.

19. Apparatus for measuring the torque required to rotate a rotatable component of a device to be tested, said apparatus comprising a reactive torque drive assembly, control means for causing said reactive torque drive assembly to apply a torque to said rotatable component, and means driven by said reactive torque drive assembly for generating an output signal representative of the torque required to rotate said rotatable component in said device;

said reactive torque drive assembly comprising a stepper motor having a housing and a rotatable output shaft, motor support means rotatably mounting said motor housing to a chassis for rotation on an axis that is coaxial with said motor housing and said output shaft, first and second force-transmitting means attached to and rotatable with said motor housing relative to said chassis, and means for coupling said output shaft of said motor to the rotatable component of a device to be tested;

said driven means comprising first and second flexible beams each mounted to said chassis in cantilever fashion so that one end thereof is fixed to said chassis and the other end thereof is free to flex relative to said chassis, said other ends of said first and second beams are engaged by said first and second force-transmitting means so that rotation of said motor housing will cause said first or second force-transmitting means to force said first or second beam respectively to bend depending on the direction of rotation of said motor housing, and signal-generating means for generating a signal in accordance with rotation of said motor housing; and said control means comprising means for selectively energizing said motor, whereby if said output shaft of said motor is coupled to the rotatable component of a device to be tested (a) said output shaft will apply torque to said rotatable component, (b) in response to the resistance to rotation offered by said rotatable component said motor housing will rotate in a direction opposite to the direction of rotation of said output shaft and cause said first or second force-transmitting means to force said first or second beam respectively to bend depending on the direction of rotation of said motor housing, and (c) said signal generating means will generate a signal representative of the magnitude of the torque required to cause rotation of said rotatable component.

20. Apparatus according to claim 19 wherein said signal generating means comprises an encoder having an input shaft, and further comprising means coupling said input shaft to said motor housing whereby said encoder input shaft rotates in synchronism said motor housing.

* * * * *

UNITED STATES PATENT AND TRADEMARK OFFICE
CERTIFICATE OF CORRECTION

| | | |
|---|---|---|
| PATENT NO. | : 7,281,438 B2 | Page 1 of 1 |
| APPLICATION NO. | : 11/269344 | |
| DATED | : October 16, 2007 | |
| INVENTOR(S) | : Robert F. Searle | |

It is certified that error appears in the above-identified patent and that said Letters Patent is hereby corrected as shown below:

Column 9, claim 1, line 38, change "seconds" to -- second ends --;

Column 10, claim 3, line 18, insert -- a -- before "belt";

Column 10, claim 7, line 33, delete "first and second" (second occurrence);

Column 10, claim 12, line 57, change "end" to --ends--;

Column 11, claim 13, line 55, insert -- said -- before "motor support";

Column 11, claim 13, line 55, insert -- said -- before "motor housing";

Column 12, claim 14, line 20, insert -- said -- before "chassis"; and

Column 12, claim 17, line 35, change "shat" to -- shaft --.

Signed and Sealed this

Eighteenth Day of December, 2007

JON W. DUDAS
*Director of the United States Patent and Trademark Office*